US012060958B2

(12) United States Patent
Tang et al.

(10) Patent No.: US 12,060,958 B2
(45) Date of Patent: Aug. 13, 2024

(54) PURE ELECTRIC MODULAR SUBSEA TEST TREE

(71) Applicant: Southwest Petroleum University, Chengdu (CN)

(72) Inventors: Yang Tang, Chengdu (CN); Yulin Zhang, Chengdu (CN); Guorong Wang, Chengdu (CN); Yufa He, Beijing (CN); Jianfei Wei, Tianjin (CN); Jinhai Zhao, Beijing (CN); Zeliang Li, Chengdu (CN); Jinzhong Wang, Tangshan (CN); Wang Li, Chengdu (CN); Wujun Tong, Zhanjiang (CN); Jie Wang, Chengdu (CN)

(73) Assignee: Southwest Petroleum University, Chengdu (CN)

( * ) Notice: Subject to any disclaimer, the term of this patent is extended or adjusted under 35 U.S.C. 154(b) by 73 days.

(21) Appl. No.: 18/169,145

(22) Filed: Feb. 14, 2023

(65) Prior Publication Data

US 2024/0003473 A1 Jan. 4, 2024

(30) Foreign Application Priority Data

Jun. 29, 2022 (CN) .......................... 202210762345.5

(51) Int. Cl.
*F16L 29/00* (2006.01)
*E21B 33/035* (2006.01)
(Continued)

(52) U.S. Cl.
CPC .......... *F16L 29/007* (2013.01); *E21B 33/035* (2013.01); *E21B 34/04* (2013.01);
(Continued)

(58) Field of Classification Search
CPC ....... F16L 29/007; F16L 37/004; F16L 37/30; F16L 37/373; F16L 53/34; F16L 53/38;
(Continued)

(56) References Cited

U.S. PATENT DOCUMENTS

| 4,256,282 A * | 3/1981 | Goldschild ........... E21B 33/076 |
| | | 166/321 |
| 5,771,974 A * | 6/1998 | Stewart ................. E21B 34/045 |
| | | 166/336 |

(Continued)

FOREIGN PATENT DOCUMENTS

| CN | 110529072 A | 12/2019 |
| CN | 210858667 U | 6/2020 |

(Continued)

*Primary Examiner* — William M McCalister

(57) ABSTRACT

A pure electric modular subsea test tree is provided, which includes a connect-disconnect device, wherein the first channel is formed in the connect-disconnect device; the connect-disconnect device is provided with a locking assembly and a connection drive mechanism for driving the locking assembly, and the first electrical connection plug is embedded in the connect-disconnect device, and the connection drive mechanism is electrically connected with the first electrical connection plug; a shear-seal assembly, wherein a second channel communicated with the first channel is formed in the shear-seal assembly; the shear-seal assembly includes at least one shear-seal device capable of plugging the second channel; a connection part is formed on the shear-seal assembly; a heating device is arranged at one end of the shear-seal device far from the connection part. The disclosure relates to a pure electric modular subsea test tree, which has fast response speed and high operation safety.

12 Claims, 11 Drawing Sheets

(51) Int. Cl.
*E21B 34/04* (2006.01)
*E21B 36/04* (2006.01)
*E21B 47/001* (2012.01)
*F16L 37/00* (2006.01)
*F16L 37/30* (2006.01)
*F16L 37/373* (2006.01)
*F16L 53/34* (2018.01)
*F16L 53/38* (2018.01)

(52) U.S. Cl.
CPC ............ *E21B 36/04* (2013.01); *E21B 47/001* (2020.05); *F16L 37/004* (2013.01); *F16L 37/30* (2013.01); *F16L 37/373* (2013.01); *F16L 53/34* (2018.01); *F16L 53/38* (2018.01)

(58) Field of Classification Search
CPC ........ E21B 33/035; E21B 34/04; E21B 36/04; E21B 47/001
See application file for complete search history.

(56) References Cited

U.S. PATENT DOCUMENTS

| | | | |
|---|---|---|---|
| 6,026,905 A * | 2/2000 | Garcia-Soule | E21B 34/045 |
| | | | 166/336 |
| 8,783,360 B2 * | 7/2014 | Zediker | E21B 29/12 |
| | | | 166/55.6 |
| 9,376,889 B2 * | 6/2016 | Reid | E21B 34/06 |
| 9,376,891 B2 * | 6/2016 | Reid | E21B 34/06 |
| 9,624,753 B2 * | 4/2017 | Stinessen | F16K 41/00 |
| 10,006,270 B2 * | 6/2018 | Schwendemann | E21B 21/08 |
| 10,352,123 B2 * | 7/2019 | Landry | E21B 33/03 |
| 11,306,750 B2 * | 4/2022 | Shu | F15B 15/18 |
| 2007/0204999 A1 * | 9/2007 | Cowie | E21B 33/043 |
| | | | 166/368 |
| 2008/0149343 A1 * | 6/2008 | Chitwood | E21B 36/04 |
| | | | 166/360 |
| 2017/0328164 A1 * | 11/2017 | Partridge | F16L 37/62 |

FOREIGN PATENT DOCUMENTS

| | | |
|---|---|---|
| CN | 113445962 A | 9/2021 |
| CN | 114320178 A | 4/2022 |
| CN | 216381322 U | 4/2022 |
| CN | 216429589 U | 5/2022 |

* cited by examiner

PURE ELECTRIC MODULAR SUBSEA TEST TREE

CROSS-REFERENCE TO RELATED APPLICATIONS

This application claims priority to Chinese Application No. 202210762345.5, filed on Jun. 29, 2022, entitled "a pure electric modular subsea test tree". These contents are hereby incorporated by reference.

TECHNICAL FIELD

The disclosure relates to the technical field of offshore oil and gas development, in particular to a pure electric modular subsea test tree.

BACKGROUND

Due to the frequent occurrence of typhoons in the deep sea area, there are many problems such as internal wave flow, multiphase flow, platform drift, well control, etc., which is high risk and difficult to control. During the exploration, drilling, testing, well completion, well cleaning and blowout, well repair and other operations of deep-sea oil and gas, combustible ice and other resources, the floating platform or drilling vessel used in the operation will have heave, pitch, roll and other movements under the influence of wind, wave, current, etc., and the pipe string connected to it will also move accordingly. In case of severe sea conditions, such as typhoon, tide, tsunami, etc., and the operation is required to be stopped immediately, the high-pressure fluid in the pipe string at the subsea wellhead shall be blocked through the subsea test tree on the pipe string, and the pipe string shall be quickly disconnected so that the platform or drilling vessel can evacuate quickly to ensure the safety of the platform, staff and equipment. If the personnel fail to evacuate safely in time, serious safety accidents such as sinking of floating platforms or drilling vessels may occur, which would threaten the life safety of staff, and cause huge equipment and economic losses. Further, the oil and gas leakage would cause the serious pollution of the marine ecological environment.

Existing subsea test trees generally include the connector and the shear-seal device. The connectors are used to connect with the shear-seal device, which is mainly controlled directly by hydraulic pressure.

Specifically, hydraulic direct control is controlled through long distance hydraulic pipeline in deep water environment. Due to the characteristics of hydraulic transmission, its response time has a certain lag, which greatly affects the evacuation efficiency of the drilling ship. Moreover, the hydraulic oil in the hydraulic transmission is easy to leak, and the pollution of the hydraulic oil may even lead to the failure of the hydraulic system. The flow of hydraulic oil in the pipeline will cause pressure loss. The pressure loss will be higher when the pipeline is longer, and the power transfer efficiency will be reduced as well. In addition, the hydraulic oil will also cause pipeline deformation after long use. In addition, when the environment changes too much, the hydraulic oil is not easy to maintain the stability of the load movement speed. Therefore, hydraulic transmission is not suitable for remote control and transmission, which limits the scope of subsea test tree. And the response speed of hydraulic control is slow, which is not conducive to efficient control.

In addition to the above deficiencies, the existing subsea test tree, because the operating environment is located on the seabed, oil-gas mixture at the collection port is very easy to mix with seawater to form ice-like crystalline substances due to low temperature and high pressure. Because the pipeline opening of the subsea test tree is small, crystalline substances are very easy to accumulate in the pipeline of the subsea test tree, thus affecting the normal operation of various internal parts, which will influence the operation efficiency and safety.

SUMMARY OF THE INVENTION

This disclosure aims to solve one of the technical problems existing in the prior art. For this reason, this disclosure provides a pure electric modular subsea test tree: the connect-disconnect device and the shear-seal assembly are electrically connected through the electrical connection plug, so that all parts are electrically driven, so that the connect-disconnect device and the shear-seal assembly respond quickly. In addition, the shear-seal assembly is equipped with a heating device, which can heat the oil-gas mixture to prevent the crystallization of the oil-gas mixture from affecting the normal operation of the shear-seal device, so that the operation safety is high.

According to the disclosure, a pure electric modular subsea test tree includes:
  a connect-disconnect device, wherein the connect-disconnect device includes a first outer shell and a first inner tube, wherein a first channel is formed in the first inner tube; a locking assembly and a connection drive mechanism for driving the locking assembly are arranged between the first outer shell and the first inner tube; a first electrical connection plug is embedded on a bottom end face of the first outer shell, and the connection drive mechanism is electrically connected with the first electrical connection plug;
  a shear-seal assembly, wherein a second channel is formed in the shear-seal assembly, and the first channel is communicated with the second channel in a connected state; the shear-seal assembly includes a second outer shell assembly and at least one shear-seal device arranged inside the second outer shell assembly and configured to seal the second channel; a connection part configured for locking connection with the locking assembly is formed on the second outer shell assembly; a second electrical connection plug configured for inserting and matching with the first electrical connection plug is arranged on the connection part; a heating device is arranged at one end of the shear-seal device far from the connection part, and the heating device and the shear-seal device are electrically connected with the second electrical connection plug.

According to the embodiment of this disclosure, a pure electric modular subsea test tree has at least the following advantageous effects:

The first electrical connection plug and the second electrical connection plug are respectively arranged on the connect-disconnect device and the shear-seal assembly, so that the connection drive mechanism on the connect-disconnect device and the shear-seal assembly can be electrically driven. Compared with the hydraulic control method used in the traditional technology, the response speed of the subsea test tree can be greatly improved, and the connect-disconnect device can be separated from the shear-seal device in time in case of emergency, thus, it is beneficial to improve operation efficiency and safety.

In addition, a heating device is set at the end far away from the connection part on the shear-seal device, which can heat the oil-gas mixture at the entrance of the second channel, and can prevent the oil-gas mixture from mixing with seawater to form crystalline substances under low temperature and high pressure which would affect the normal operation of the shear-seal device, thus improving the safety and reliability of the subsea test tree.

In some embodiments, the heating device includes an inner tube, an outer tube and a plurality of electric heating rods, wherein the plurality of the electric heating rods arranged between the inner tube and the outer tube at intervals along a circumferential direction.

In some embodiments, an outer wall of the outer tube is provided with a thermal insulation layer.

In some embodiments, the connection drive mechanism is an electromagnetic driving structure; a first magnetic member is arranged on the locking assembly, and the connection drive mechanism is used to generate a magnetic force that attracts or repels the first magnetic member, so that the locking assembly is locked and connected with the connection part.

In some embodiments, the connection part is provided with a second magnetic member, and the connection drive mechanism is used to generate the magnetic force that attracts or repels the second magnetic member.

In some embodiments, a positioning groove is arranged on the connection part corresponding to the locking assembly; the locking assembly includes a fixing ring, balls and a movable ring; the fixing ring is arranged at an outer side of the first inner tube, and a wall thickness of the fixing ring is less than a diameter of each of the balls; through holes are arranged at intervals on a circumference surface of a side wall of the fixing ring; the balls are respectively arranged at the through holes; the movable ring is sleeved at an outer side of the fixing ring and is capable to slide relative to the fixing ring; the first magnetic member is arranged at a top of the movable ring, and a bottom of the movable ring is provided with a guide groove, a groove wall of the guide groove pushes the balls to roll and engage in the positioning groove when the guide groove is in contact with the balls.

In some embodiments, the connection drive mechanism includes a first electromagnetic attraction structure and a second electromagnetic attraction structure arranged at intervals in a direction of an axis of the first channel, and the first magnetic member is arranged between the first electromagnetic attraction structure and the second electromagnetic attraction structure.

In some embodiments, when the number of the shear-seal devices provided is two or more, the second outer shell assembly includes a plurality of second outer shells and a plurality of connectors, two adjacent second outer shells are connected through the connectors, each of the shear-seal devices is arranged inside each of the second outer shells, and the heating device is sleeved in hollow interiors of the connectors.

In some embodiments, when the number of the shear-seal devices provided is two or more, the shear-seal device closer to a top of the shear-seal assembly is an electric control ball valve mechanism, and the shear-seal device closer to a bottom of the shear-seal assembly is an electric control ball valve mechanism or an electric control flap valve mechanism.

In some embodiments, the electric control ball valve mechanism includes a ball valve drive device, a drive ring and a ball valve assembly; the ball valve assembly includes an upper valve seat, a lower valve seat and a ball valve body, wherein the upper valve seat and the lower valve seat are arranged in the second outer shell; the ball valve body is rotatably arranged in a valve cavity formed between the upper valve seat and the lower valve seat; the ball valve body is provided with a shear notch, and the ball valve body rotates to close the second channel; the ball valve drive device is arranged on an inner side wall of the second outer shell and at a bottom of the ball valve assembly; the drive ring connects the ball valve drive device and the ball valve body; the ball valve drive device is used to drive the drive ring to slide along an axial direction to drive the ball valve body to rotate.

In some embodiments, on a side wall of the ball valve body and on an axis where a center of a circle is located, bosses are symmetrically arranged along the radial direction, first guide grooves are arranged on an inner wall of the drive ring, and the bosses are capable to slide relative to the first guide groove correspondingly; the side wall of the ball valve body is symmetrically provided with second guide grooves deviating from a center of the ball valve body, and the inner wall of the drive ring is provided with drive blocks inserted in the corresponding second guide groove; when the drive ring slides along the axial direction, the drive blocks push the ball valve body to rotate.

In some embodiments, the ball valve drive device is a hollow shaft motor, and the drive ring is threaded with a rotor of the hollow shaft motor.

In some embodiments, a second inner tube is arranged inside the second outer shell, the drive ring is sleeved at an outer side the second inner tube, and a spring is connected between the lower valve seat and a top end of the second inner tube.

In some embodiments, the electric control flap valve mechanism includes a valve body, a second electromagnetic drive assembly and a third inner pipe; the valve body includes a valve seat and a valve flap, and a torsion spring configured to control the valve flap in closed state is arranged between the valve flap and the valve seat; wherein, the second electromagnetic drive assembly is arranged on an inner side wall of the second outer shell, the third inner pipe is sleeved in the second outer shell, and a diameter of the third inner pipe is smaller than a diameter of an opening of the valve seat; the third inner pipe is capable to penetrate the opening of the valve seat and make the valve flap open towards a bottom side of the second outer shell; a third magnetic member is arranged at one end of the third inner pipe; the second electromagnetic drive assembly is used to drive the third inner pipe to slide, so as to make the valve flap open or close.

In some embodiments, a first elastic element is arranged between the valve seat and the second inner tube.

In some embodiments, the second electromagnetic drive assembly includes a third electromagnetic attraction structure and a fourth electromagnetic attraction structure arranged in sequence in an axial direction of the second channel, and the third magnetic member is arranged between the third electromagnetic attraction structure and the fourth electromagnetic attraction structure.

In some embodiments, the second outer shell is provided with a high-pressure flow channel, and the high-pressure flow channel is communicated with a side wall of the second outer shell and the connection part.

In some embodiments, an auxiliary separation structure is arranged between the connect-disconnect device and the shear-seal assembly; the auxiliary separation structure includes a torsion ring and a thread arranged on the connect-disconnect device; the torsion ring is threaded with the connect-disconnect device, and a bottom end of the torsion ring is abutted against an end face of the connection part.

Additional aspects and advantages of this disclosure will be given in the following description, and some will become obvious from the following description, or learned from the practice of this disclosure.

DETAILED DESCRIPTION OF PREFERRED EMBODIMENTS

The specific embodiments of the present disclosure will be further described in detail with reference to the drawings and embodiments.

Figure 1:
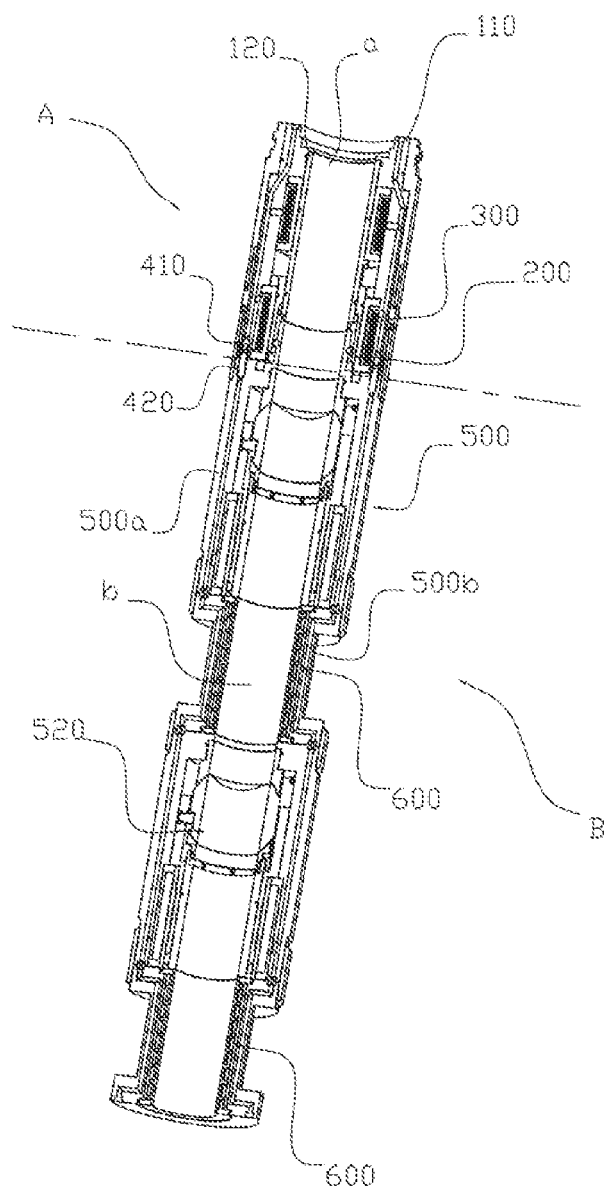
FIG. 1 is a sectional view of a pure electric modular subsea test tree in one embodiment of the present disclosure.
Figure 12:
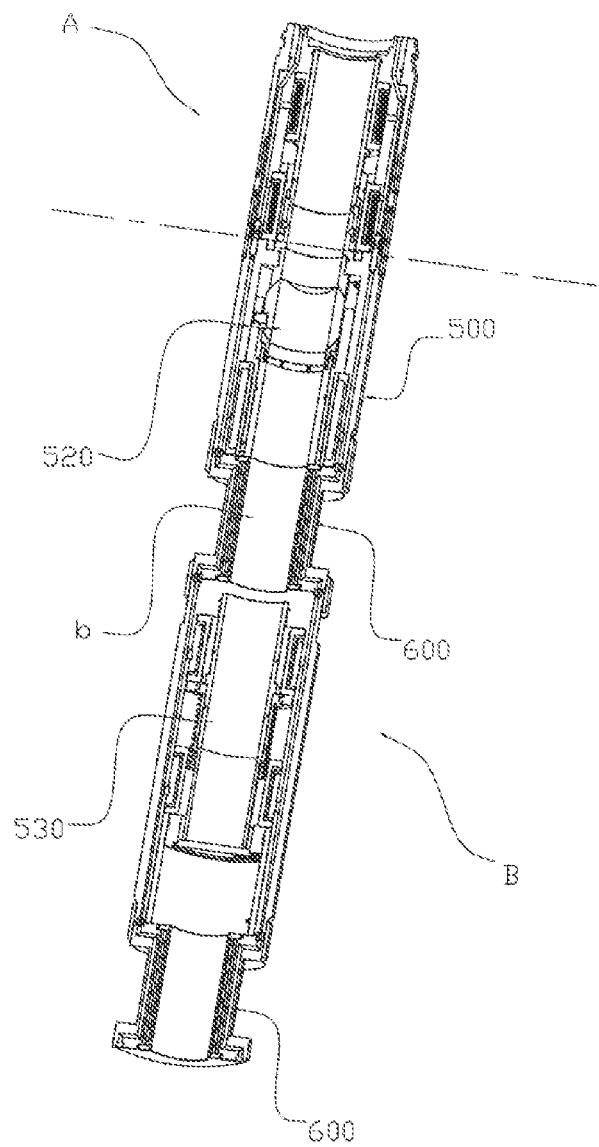
FIG. 12 is a sectional view of a pure electric modular subsea test tree in another embodiment of the present disclosure.
Figure 13:
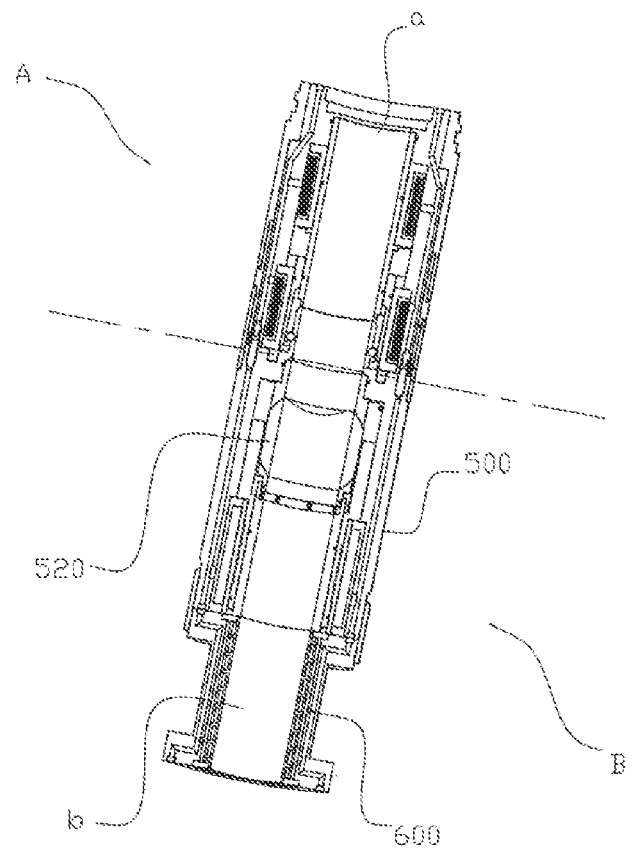
FIG. 13 is a sectional view of a pure electric modular subsea test tree in another embodiment of the present disclosure.

As shown in FIGS. 1, 12 and 13, the pure electric modular subsea test tree of this disclosure includes:

a connect-disconnect device A, wherein the connect-disconnect device includes a first outer shell 110 and a first inner tube 120, and a first channel a is formed in the first inner tube 120; a locking assembly 200 and a connection drive mechanism 300 for driving the locking assembly 200 are arranged between the first outer shell 110 and the first inner tube 120; a first electrical connection plug 410 is embedded on a bottom end face of the first outer shell 110, and the connection drive mechanism 300 is electrically connected with the first electrical connection plug 410;

a shear-seal assembly B, wherein a second channel b is formed in the shear-seal assembly, and the first channel a is communicated with the second channel b in a connected state; the shear-seal assembly B includes a second outer shell assembly 500 and at least one shear-seal device arranged inside the second outer shell assembly 500 and configured to seal the second channel b; a connection part 510 configured for locking connection with the locking assembly 200 is formed on the second outer shell assembly 500; a second electrical connection plug 420 configured for inserting and matching with the first electrical connection plug 410 is arranged on the connection part 510; a heating device 600 is arranged at one end of the shear-seal device far from the connection part 510, and the heating device 600 and the shear-seal device are electrically connected with the second electrical connection plug 420.

Both the connect-disconnect device A and the shear-seal assembly B are hollow. Specifically, the first channel a is formed in the connect-disconnect device A, and the second channel b is formed in shear-seal assembly B. In the connected state, the first channel a and the second channel b are communicated with each other. During operation, the shear-seal assembly B is inserted at the collection port on the seabed surface, and a transporting pipe is provided between the first channel a and the second channel b and connected to the mining ship or mining platform to realize the transmission of oil and gas from the collection port to the mining ship. At the same time, it is also necessary to understand that during operation, the top of the connect-disconnect device A is connected with a pipeline, the transporting pipe is sleeved inside the pipeline, and the pipeline is buried with cables and other control lines to realize electrical connection control.

Specifically, a connection drive mechanism 300 is arranged between the first outer shell 110 and the first inner tube 120 of the connect-disconnect device A, and the first electrical connection plug 410 is buried in the first outer shell 110. The first electrical connection plug 410 is connected with the cables in the pipeline, and the connection drive mechanism 300 is electrically connected with the first electrical connection plug 410, so as to realize the electrical control of the connection drive mechanism 300. Further, the locking assembly 200 is arranged between the first outer shell 110 and the first inner tube 120 of the connect-disconnect device A, and the connection drive mechanism 300 is used to drive the locking assembly 200 and the connection part 510 on the shear-seal assembly B to lock and match, thus realizing the fixed connection between the connect-disconnect device A and the shear-seal assembly B. In this way, the connection between the connect-disconnect device A and the shear-seal assembly B is driven by electricity. Compared with the hydraulic control method in conventional technology, the locking assembly 200 on the connect-disconnect device A can respond quickly, thus connecting or separating with shear-seal assembly B quickly, with fast connection efficiency and high operation safety.

Specifically, as shown in FIG. 13, a shear-seal assembly B is provided with a shear-seal device. Or, according to the actual operation situation, referring to FIG. 1 or FIG. 12, there are provided with a plurality of shear-seal devices in the axis direction of the second channel b. Each shear-seal devices is capable to block the different axial positions of the second channel b at the same time, so as to improve the plugging effect. At the same time, each shear-seal devices is driven by electricity, which is capable to improve the response speed of the shear-seal devices, and quickly block the second channel b in case of emergency, thus improving the operation safety.

Further, in the shear-seal assembly B, a heating device 600 is arranged at the end of the shear-seal device far away from the connection part 510. It should be noted that the heating device 600 is arranged in the second channel b. Because the operating environment of the subsea test tree is located on the deep-sea surface, where the environment is low temperature and high pressure, and the oil-gas mixture is very easy to mix with the sea water to form ice-like crystalline substances under the low temperature and high pressure environment. If the oil-gas mixture in the second channel b of the shear-seal assembly B to form crystalline substances, it is very easy to cause blockage, resulting in the failure of the normal operation of the shear-seal device, and affecting the realization of the function of the shear-seal assembly B, it will lead to the failure of shear-seal assembly B in emergency, affecting the operation safety. Based on this, the heating device 600 is set in the second channel b to heat the oil-gas mixture in the second channel b, so that the oil-gas mixture can be separated from the crystallization environment, which can effectively ensure the smooth operation of the second channel b. Thus, the smooth operation of the shear-seal devices can be ensured, which is conducive to improving the reliability and safety of the shear-seal assembly B.

As shown in FIG. 1, FIG. 10, FIG. 12 and FIG. 13, the heating device 600 includes an inner tube 610, an outer tube 620 and a plurality of electric heating rods 630, wherein the plurality of the electric heating rods 630 arranged between the inner tube 610 and the outer tube 620 at intervals along a circumferential direction.

Specifically, the hollow interior of the inner tube 610 is connected with the second channel b. At the same time, the electric heating rod 630 is arranged between the inner tube 610 and the outer tube 620. After the electric heating rod 630 is electrified and heated, the oil-gas mixture passing through the inner tube 610 is heated, so that the oil-gas mixture can be separated from the environment of low temperature and high pressure. Thus, the oil-gas mixture can be prevented from mixing with seawater under low temperature and high pressure to form ice-like crystalline substances.

Figure 10:
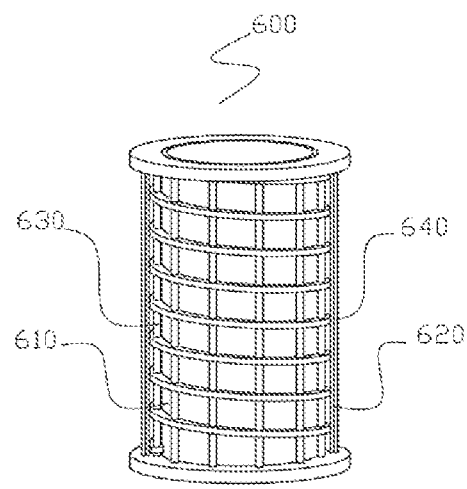
FIG. 10 is a partial sectional view of the heating device in one embodiment of the present disclosure.

Further, as shown in FIG. 10, the outer wall of the outer tube 620 is also provided with an thermal insulation layer 640. The thermal insulation layer 640 is used to prevent the heat generated by the electric heating rod 630 from losing too quickly in the external low temperature environment, which is conducive to improving the thermal insulation effect and saving the energy consumption of the electric heating rod 630.

Figure 2:
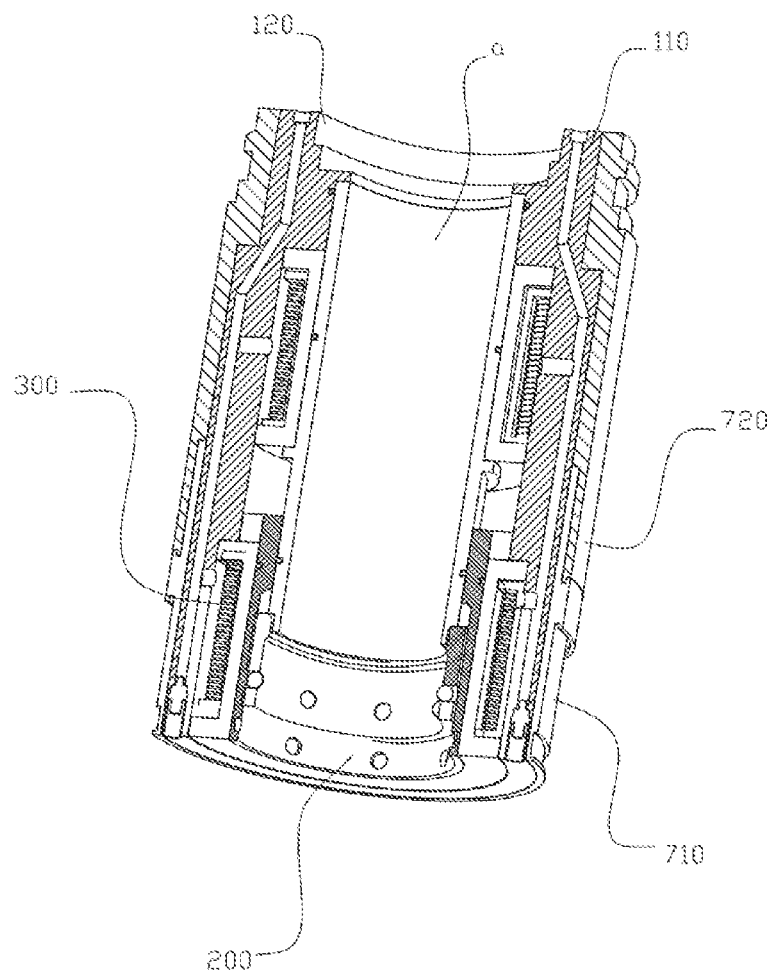
FIG. 2 is a sectional view of the connect-disconnect device in one embodiment of the present disclosure.
Figure 3:
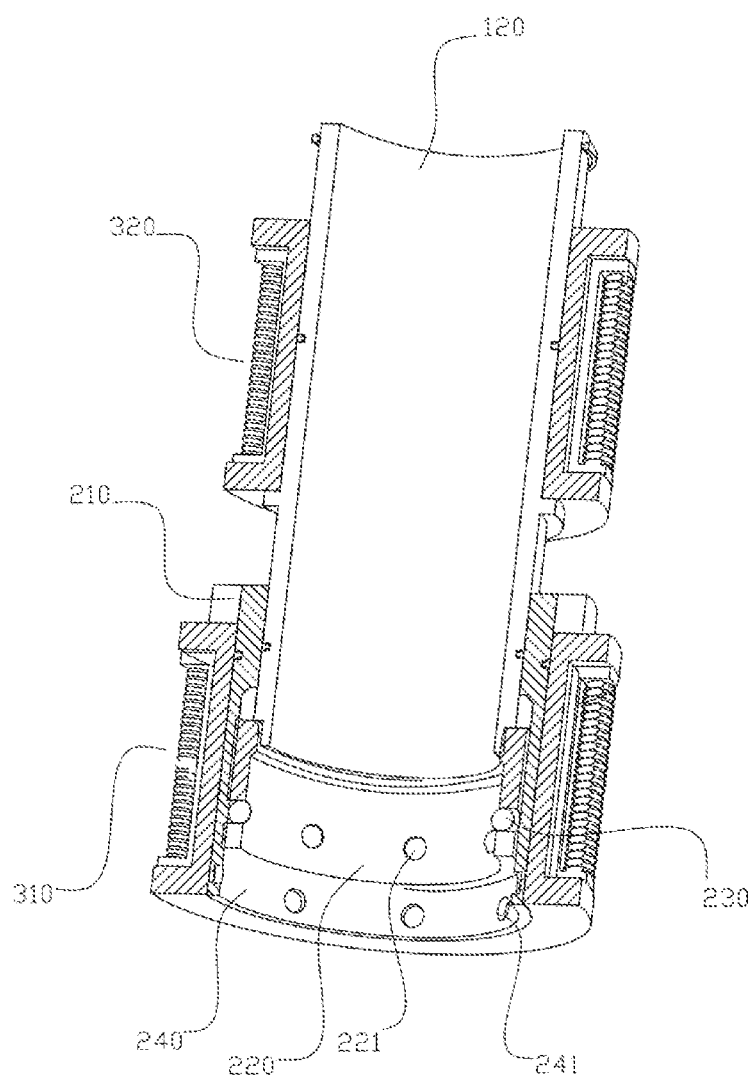
FIG. 3 is a sectional view of the connection drive mechanism and the locking assembly in the assembly state in one embodiment of the disclosure.

As shown in FIG. 2 and FIG. 3, in some embodiments, the connection drive mechanism 300 is an electromagnetic drive structure. The first magnetic member 210 is arranged on the locking assembly 200, and the electromagnetic drive mechanism is used to generate the magnetic force that attracts or repels the first magnetic member 210, so that the locking assembly 200 is locked and connected with the connection part 510.

Specifically, the connection drive mechanism 300 is set as an electromagnetic drive structure, and the first magnetic member 210 is arranged on the locking assembly 200. In this way, a forward current is applied to the connection drive mechanism 300 to generate magnetic attraction, which can make the connection drive mechanism 300 attract the first magnetic member 210, so that the locking assembly 200 moves forward and is locked with the connection part 510. Alternatively, by applying a reverse current to the connection drive mechanism 300 to generate a repulsive force, the connection drive mechanism 300 pushes the first magnetic member 210 away, so that the locking assembly 200 is capable to move in the reverse direction, thus leaving the locking state with the connection part 510 and separating from each other. It should be understood that after the locking assembly 200 is locked and connected with the connection part 510, the connection drive mechanism 300 is continuously energized with a forward current, so that the connection drive mechanism 300 can keep the locking assembly 200 in a stable locking state.

Through the above setting, the connection drive mechanism 300 has simple structure, stable drive and convenient control, thus also has low failure rate and strong reliability.

Figure 4:
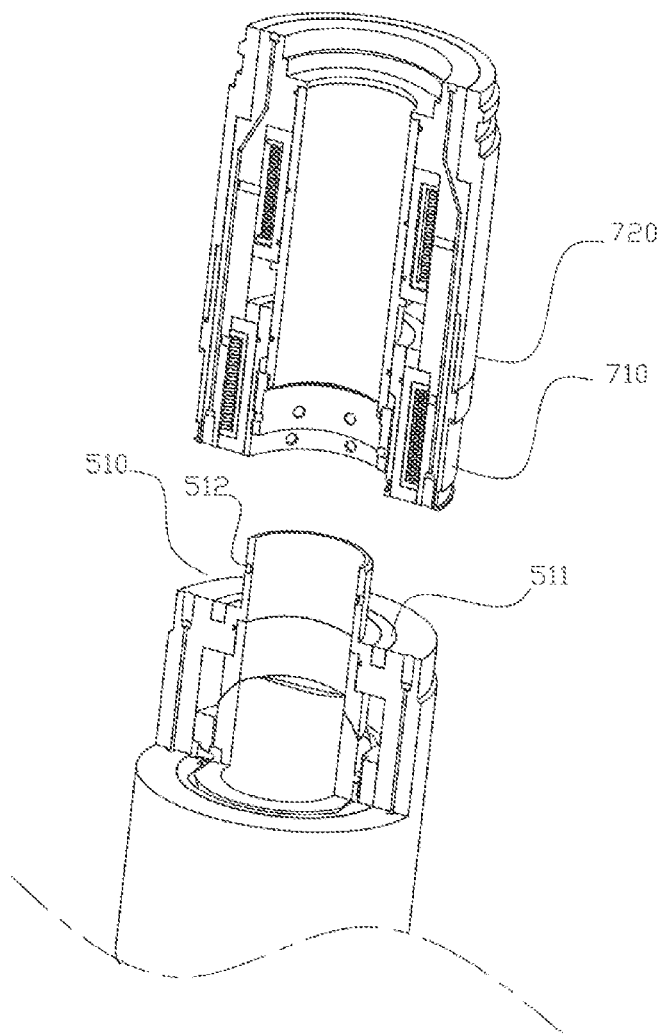
FIG. 4 is an exploded view showing the connection position of the connect-disconnect device and the shear-seal assembly in one embodiment of the disclosure.

As shown in FIG. 4, in some embodiments, a second magnetic member 511 is arranged on the connection part 510, and the connection drive mechanism 300 is used to generate the magnetic force that attracts or repels the second magnetic member 511.

A second magnetic member 511 is arranged on the end face of the connection part 510, which play an auxiliary role in the connection or separation of the shear-seal assembly B and the connect-disconnect device A. The first magnetic member 210 and the second magnetic member 511 may be made of materials with the same polarity.

Specifically, when the connection drive mechanism 300 attracts the first magnetic member 210, it also generates the magnetic attraction to attract the second magnetic member 511. Since the second magnetic member 511 is arranged on the connection part 510 of the shear-seal assembly B, therefore, in the attraction process of the second magnetic attraction 511 and the connection drive mechanism 300, the second magnetic member 511 plays a guiding role in the approach of the connect-disconnect device A, and also plays an auxiliary driving role, making the locking assembly 200 more accurate powerfully lock and connect with the connection part 510. Moreover, after the locking assembly 200 is locked and connected with the connection part 510, the connection drive mechanism 300 is continuously energized to maintain the magnetic attraction of the first magnetic member 210 and the second magnetic member 511, so as to ensure the stable connection between the connect-disconnect device A and the shear-seal assembly B. When the connection drive mechanism 300 repels the first magnetic member 210, it also produces a repulsive force that repels the second magnetic member 511. Therefore, the second magnetic member 511 pushes the connection drive mechanism 300 away from the connection part 510. At the same time, the connection drive mechanism 300 also pushes the first magnetic member 210 away, which makes the separation of the connect-disconnect device A and the shear-seal assembly B more rapid.

Through the above settings, the connection or separation efficiency between the connect-disconnect device A and the shear-seal assembly B is higher.

As shown in FIG. 2 to FIG. 4, in some embodiments, a positioning groove 512 is arranged on the connection part 50 corresponding to the locking assembly 200. The locking assembly 200 includes a fixing ring 220, balls 230 and a movable ring 240. The fixing ring 220 is arranged at the outer side of the first inner tube 120, and the wall thickness of the fixing ring is less than the diameter of each of the balls 230. Through holes 221 are arranged at intervals on the circumference surface of the side wall of the fixing ring 220, and the balls 230 are respectively arranged at the through holes 221. The movable ring 240 is sleeved at the outer side of the fixing ring 220 and is capable to slide relative to the fixing ring 220. The first magnetic member 210 is arranged at the top of the movable ring 240, the bottom of the movable ring 240 is provided with a guide groove 241, and the groove wall of the guide groove 241 pushes the balls 230 to roll and engage in the positioning groove 512 when the guide groove 241 is in contact with the balls 230.

Through the above settings, when the connection drive mechanism 300 attracts the first magnetic member 210, the movable ring 240 moves along the axial direction of the first channel a. When the guide groove 241 on the movable ring 240 contacts with the balls 230 in the through holes 221 of the fixing ring 220, and pushes the balls 230 to gradually move towards the positioning groove 512 on the connection part 510, the movable ring 240 continues to move under the drive of the first magnetic member, and when the positions of the guide groove 241 and the balls 230 are staggered, the balls 230 contact with the inner wall of the movable ring 240. At this time, the balls 230 have been clamped between the positioning groove 512 and the through holes 221 of the fixing ring 220, and the connection part 510 and the locking assembly 200 are locked with each other. At the same time, the first electrical connection plug 410 on the connect-disconnect device A is connected with the second electrical connection plug 420 on the shear-seal assembly B. Similarly, when the connection drive mechanism 300 repels the first magnetic member 210, the movable ring 240 moves in reverse direction until the balls 230 roll into the guide groove 241 and completely leave the positioning groove 512, thus separating the locking assembly 200 from the connection part 510.

As shown in FIG. 2 and FIG. 3, in some embodiments, the connection drive mechanism 300 includes the first electromagnetic attraction structure 310 and the second electromagnetic attraction structure 320 which are arranged at intervals in the direction of the axis of the first channel a. The first magnetic member 210 is arranged between the first electromagnetic attraction structure 310 and the second electromagnetic attraction structure 320.

The first electromagnetic attraction structure 310 is arranged below the second electromagnetic attraction structure 320 at a certain distance.

Both the first electromagnetic attraction structure 310 and the second electromagnetic attraction structure 320 are provided with coils, so that they can generate magnetic attraction when energized.

When a forward current is applied to the connection drive mechanism 300, the first electromagnetic attraction structure 310 and the second electromagnetic attraction structure 320 can generate magnetic attraction with opposite magnetism, so that when the first electromagnetic attraction structure 310 attracts the first magnetic member 210, the second electromagnetic attraction structure 320 repels the first magnetic member 210, that is, the second electromagnetic attraction mechanism assists to push the first magnetic member 210 close to the first electromagnetic attraction structure 310. In this way, during the connection between the connect-disconnect device A and the shear-seal assembly B, the movable ring 240 can be more powerful to push the balls 230 to roll in the through holes 221 and snap into the positioning groove 512. In the process of separation of the connect-disconnect device A and the shear-seal assembly B, the process is reversed. Specifically, when the second electromagnetic attraction structure 320 adsorbs the first magnetic member 210, the first electromagnetic attraction structure 310 repels the first magnetic member 210, which is beneficial to improve the separation speed.

Figure 14:
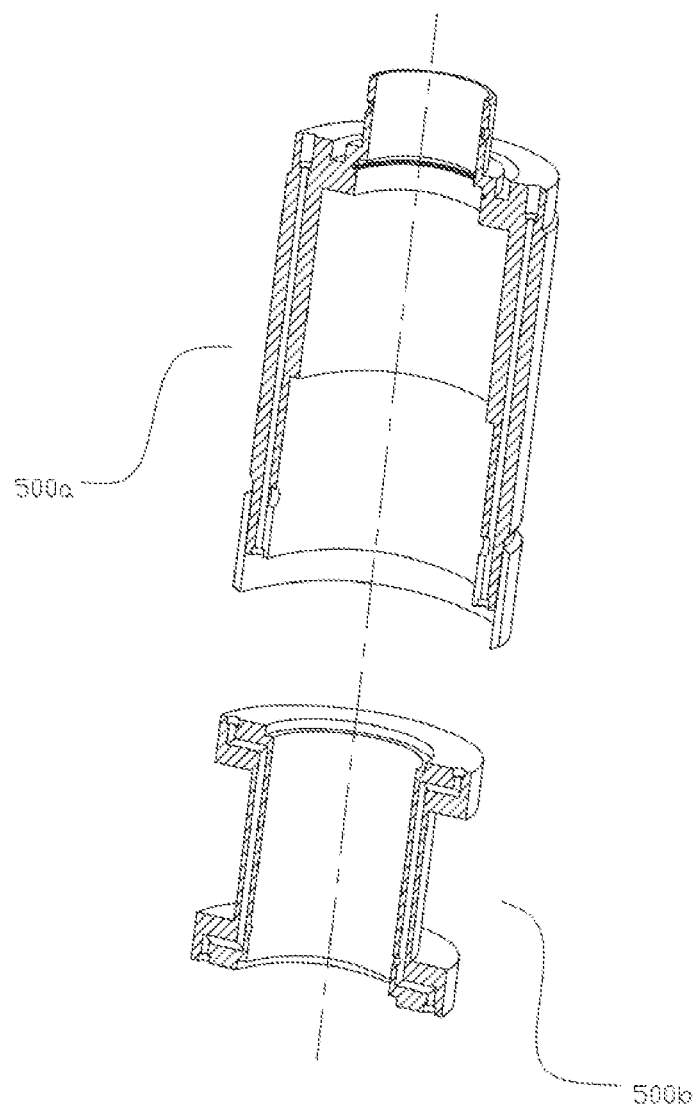
FIG. 14 is a sectional view of the second outer shell assembly in one embodiment of the present disclosure.

As shown in FIG. 1, FIG. 12 and FIG. 14, in some embodiments, when there are two or more shear-seal devices, the second outer shell assembly 500 includes a plurality of second outer shells 500a and a plurality of connectors 500b, the two adjacent second outer shells 500a are connected through the connectors 500b, each of shear-seal devices is arranged inside each of the second outer shells 500a, and the heating device 600 is sleeved inside in the hollow interior of the connectors 500b.

Specifically, each of shear-seal devices is arranged inside each of the second outer shell 500a, so that the shear-seal device can be assembled and disassembled easily and is convenient for later maintenance. Further, one connector 500b is connected between the two adjacent second outer shells 500a, so that even the shear-seal devices of different models and types can be easily assembled in the same shear-seal assembly B through the connectors 500b.

Further, the heating device 600 is arranged in the hollow interiors of the connectors 500b, which can ensure that the oil-gas mixture flowing through each shear-seal device will not mix with seawater to form crystalline substances near the shear-seal device due to low temperature and high pressure, resulting in the blockage of the second channel b and affecting the normal operation of the shear-seal device, thus helping to ensure the normal operation of each shear-seal device.

As shown in FIG. 1 and FIG. 12, in some embodiments, when there are two or more shear-seal devices, the shear-seal devices close to the top of shear-seal assembly B are electric control ball valve mechanism 520, and the shear-seal devices close to the bottom of shear-seal assembly B are electric control ball valve mechanism 520 or electric control flap valve mechanism 530.

Figure 5:
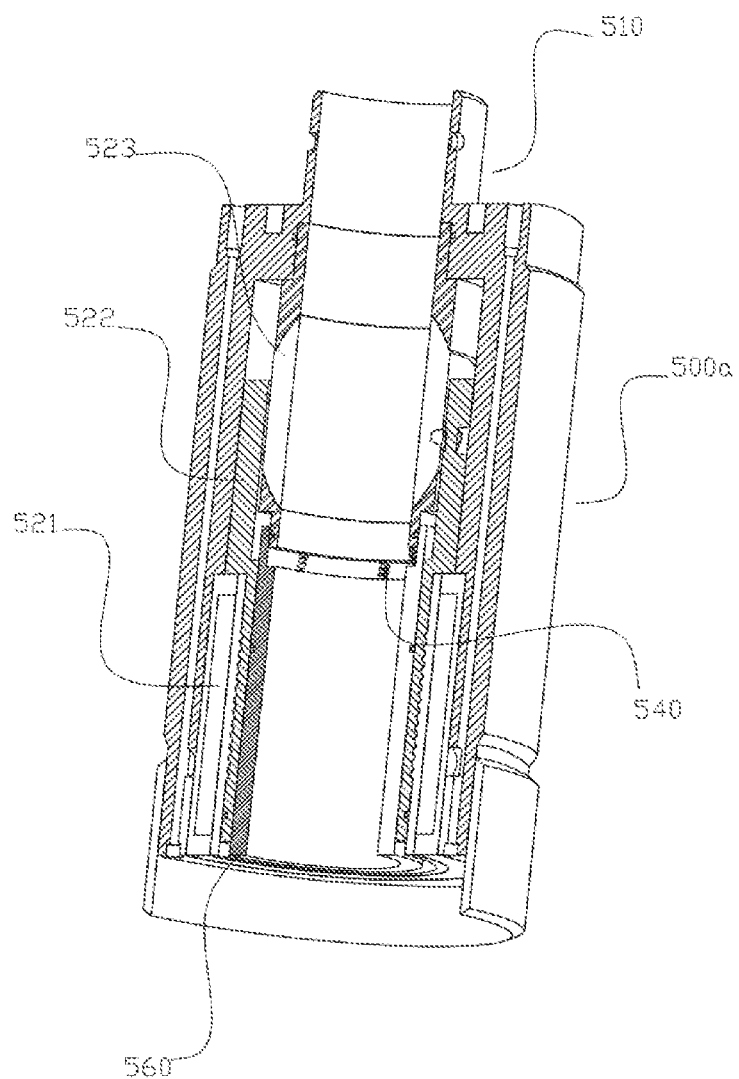
FIG. 5 is a sectional view of the assembly state of the electric control ball valve mechanism in the second outer shell in one embodiment of the disclosure.
Figure 6:
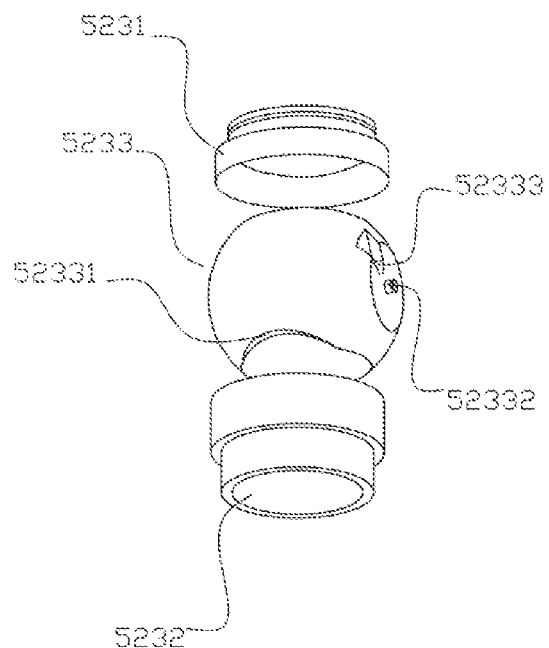
FIG. 6 is a perspective view showing the specific structure of the ball valve assembly in one embodiment of the disclosure.
Figure 7:
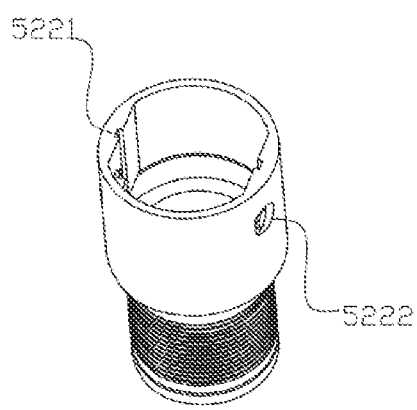
FIG. 7 is a perspective view of a drive ring in one embodiment of the present disclosure.

As shown in FIG. 5 to FIG. 7, in some embodiments, the electric control ball valve mechanism 520 includes a ball valve drive device 521, a drive ring 522 and a ball valve assembly 523. The ball valve assembly 523 includes an upper valve seat 5231, a lower valve seat 5232 and a ball valve body 5233, wherein the upper valve seat 5231 and the lower valve seat 5232 are arranged in the second outer shell 500a, the ball valve body 5233 is rotatably arranged in the valve cavity formed between the upper valve seat 5231 and the lower valve seat 5232, the ball valve body 5233 is provided with a shear notch 52331, and the ball valve body 5233 rotates to seal the second channel b. The ball valve drive device 521 is located on the inner wall of the second outer shell 500a and at the bottom of the ball valve assembly 523. The drive ring 522 connects the ball valve drive device 521 and the ball valve body 5233. The ball valve drive device 521 is used to drive the drive ring 522 to slide axially to push the ball valve body 5233 to rotate.

Specifically, the ball valve drive device 521 is arranged on the inner wall of the second outer shell 500a, and its driving end is connected with the drive ring 522. At the same time, the drive ring 522 is slidably arranged in the hollow interior of the second outer shell 500a, and the ball valve drive device 521 is used to make the drive ring 522 slide along the axial straight line. When the ball valve drive device 521 acts, its driving end pushes the drive ring 522 to slide along the axial straight line. At the same time, the ball valve assembly 523 is arranged at the top side of the ball valve drive device 521. When the drive ring 522 slides axially under the drive of the ball valve drive device 521, the drive ring 522 pushes the ball valve assembly 523 to act, so that the ball valve assembly 523 cuts off the transporting pipe and realizes the plugging of the hollow inner part of the shear-seal device.

An arc cavity capable of accommodating the ball valve body 5233 is formed between the upper valve seat 5231 and the lower valve seat 5232. It should be noted that the arc cavity is not a closed cavity, and the ball valve body 5233 is capable to rotate in the arc cavity. At the same time, a plane is symmetrically arranged on the surface of the ball valve body 5233. In the assembly state, the plane on the surface of the ball valve body 5233 is located outside the arc cavity, and a structure matching with the drive ring 522 is arranged on the plane.

Further, the ball valve body 5233 is a hollow structure, and the two opposite sides of the ball valve body 5233 are provided with shear notches 52331, and the shear notches 52331 are communicated with the hollow structure of the ball valve body 5233.

When in use, the transporting pipe passes through the second channel b and the ball valve body 5233 to transport the oil and gas from the collection port to the mining ship. When the connect-disconnect device A needs to be disconnected from the shear-seal assembly B, the ball valve drive device 521 drives the drive ring 522 to push the ball valve body 5233 to rotate, thus making the shear notch 52331 on the ball valve body 5233 rotate and cutting off the transporting pipe and achieving the plugging of the second channel b in the shear-seal assembly B.

As shown in FIG. 5 to FIG. 7, in some embodiments, on a side wall and on the axis where the center of a circle is located of the ball valve body 5233, bosses 52332 are symmetrically arranged along the radial direction, first guide grooves 5221 are arranged on the inner wall of the drive ring 522, and each of the bosses 52332 is capable to slide relative to the corresponding first guide groove 5221. The side wall of the ball valve body 5233 is symmetrically provided with second guide grooves 52333 deviating from the center of the ball valve body 5233, and the inner wall of the drive ring 522 is provided with drive blocks 5222 inserted in the second guide grooves. When the drive ring 522 slides along the axial direction, the drive blocks 5222 push the ball valve body 5233 to rotate.

The ball valve body 5233 is provided symmetrically with bosses 52332 on its side wall and on the axis of the center of the circle along the radial direction. Correspondingly, the first guide grooves 5221 are provided on the inner wall of the drive ring 522. In the assembly state, each of the bosses 52332 is inserted in the corresponding first guide groove 5221 but not fixed. Therefore, when the drive ring 522 slides along the axial straight line, the ball valve body 5233 will not move along the axial direction with the sliding of the drive ring 522.

Further, the side wall of the ball valve body where the bosses 52332 are located is symmetrically provided with second guide grooves 52333 deviating from the center of the ball valve body, and drive blocks 5222 are arranged on the drive ring 522 and located on the side of the first guide grooves 5221, wherein each of the drive blocks 5222 is inserted in the corresponding second guide groove 52333 but is not fixed. Thus, because each of the bosses 52332 is capable to slide in the corresponding first guide groove 5221, the axial position of the ball valve body 5233 in the shear-seal device will not change during the sliding of the drive ring 522. Therefore, when the drive ring 522 slides along the axial straight line, the bosses 52332 slide relative to the first guide grooves 5221, and each of the second guide grooves 52333 cooperates with the corresponding drive block 5222. When the drive ring 522 slides, the drive blocks 5222 drive the ball valve body 5233 to rotate, so that the shear notches 52331 on the ball valve body 5233 can rotate and cut off the transporting pipe, and achieve the plugging of the second channel b in the shear-seal assembly B.

The ball valve assembly 523 is set in this way, with simple structure, convenient assembly and low failure rate, which can effectively guarantee the safety and reliability of operation.

As shown in FIG. 5, in some embodiments, the ball valve drive device 521 is a hollow shaft motor, and the drive ring 522 is threaded with the rotor of the hollow shaft motor.

It can be understood that because the upper valve seat 5231 and the lower valve seat 5232 are fixed in the second outer tube 620, while the ball valve body 5233 is rotatably arranged in the arc cavity formed between the upper valve seat 5231 and the lower valve seat 5232. So when the rotor of the hollow shaft motor rotates, the drive ring 522 can only slide in a straight line along the axis and will not follow the rotor to rotate. By setting the ball valve drive device 521 as a hollow shaft motor, so that the sliding stroke of the drive ring 522 can be accurately controlled, and then the ball valve 5233 can accurately control the size of its shear notch 52331, so as to control the delivery flow of the transporting pipe.

As shown in FIG. 5, in some embodiments, the second inner tube 560 is arranged inside the second outer shell 500a, the drive ring 522 is sleeved on the outside the second inner tube 560, and the spring 540 is connected between the lower valve seat 5232 and the top of the second inner tube 560.

The second inner tube 560 is fixedly arranged inside the second outer shell 500a, the lower valve seat 5232 is arranged at the top of the second inner tube 560, and the spring 540 is connected between the lower valve seat 5232 and the top of the second inner tube 560. It should be noted that in general, the spring 540 is in natural state, when the lower valve seat 5232 is under great pressure, the spring 540 is in compressed state.

By setting the spring 540 between the second inner tube 560 and the lower valve seat 5232, the lower valve seat 5232 can move upward in the axial direction of the second channel b. When the lower valve seat 5232 compresses the spring 540, the arc cavity between the upper valve seat 5231 and the lower valve seat 5232 becomes larger, and the friction between the upper valve seat 5231 and the lower valve seat 5232 becomes smaller when the ball valve body 5233 rotates, which makes the rotation of the ball valve body 5233 more smooth. In addition, it can also prevent blowout.

More specifically, after the connect-disconnect device A is connected with the shear-seal assembly B, and before the formal operation of a pure electric modular subsea test tree, each shear-seal devices in the shear-seal assembly B is in a closed state. At this time, the second channel b in the shear-seal assembly B is blocked by the electric control ball valve mechanism 520 and/or the electric control flap valve mechanism 530.

Take the electric control ball valve mechanism 520 as an example. In the case of plugging, the shear notch 52331 of the ball valve body 5233 is staggered with the second channel b, and because the second channel b at the bottom of the electric control ball valve mechanism 520 is directly connected with the collection port, the oil-gas mixture at the collection port is in the low temperature and high pressure state, while the second channel b at the top of the electric control ball valve mechanism 520 is communicated with the first channel a. Therefore, there is a large pressure difference between the upper and lower ends of the electric control ball valve mechanism 520. At this time, if the electric control ball valve mechanism 520 is directly controlled to force the ball valve body 5233 to rotate, such that the second channel b is connected, and blowout accidents are likely to occur due to the existence of huge pressure difference. Based on this, a spring 540 is arranged between the lower valve seat 5232 and the second inner tube 560. Before the second channel b is communicated, the mining platform or mining ship located at the sea fills the first channel a with high-pressure fluid with the same pressure as the oil-gas mixture at the collection port. Since the first channel a is communicated with the second channel b and the second channel b is blocked by the ball valve body 5233, the high-pressure fluid squeezes the surface of the ball valve body 5233 and pushes the lower valve seat 5232 downward. During the downward movement of the lower valve seat 5232, the arc cavity between the upper valve seat 5231 and the lower valve seat 5232 becomes larger, and the friction force of the ball valve body 5233 gradually decreases when it rotates. Moreover, the pressure on the upper and lower sides of the ball valve body 5233 tends to be equal, after the ball valve body 5233 rotates until the second channel b is completely communicated, there will be no blowout in the second channel b, which is conducive to ensuring the safety of operation.

Figure 8:
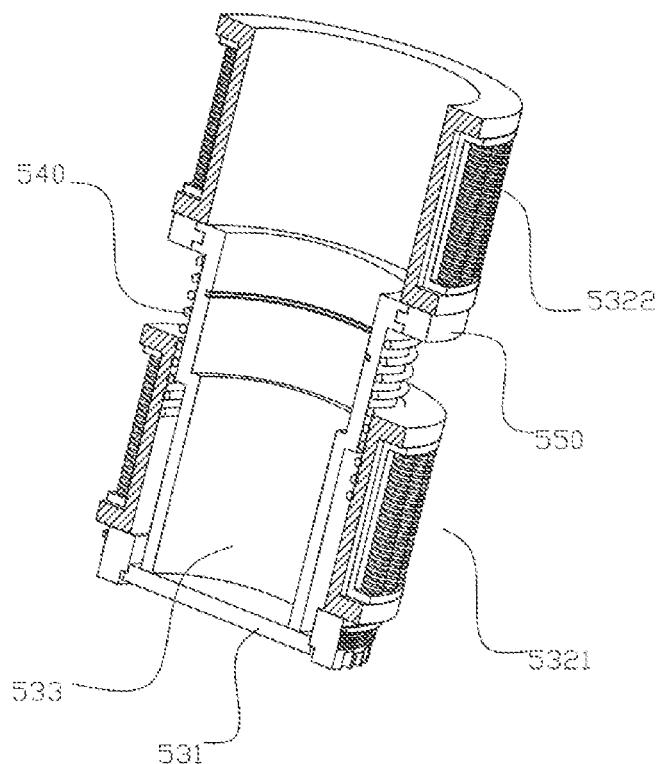
FIG. 8 is a sectional view of the electric control flap valve mechanism in one embodiment of the disclosure.
Figure 9:
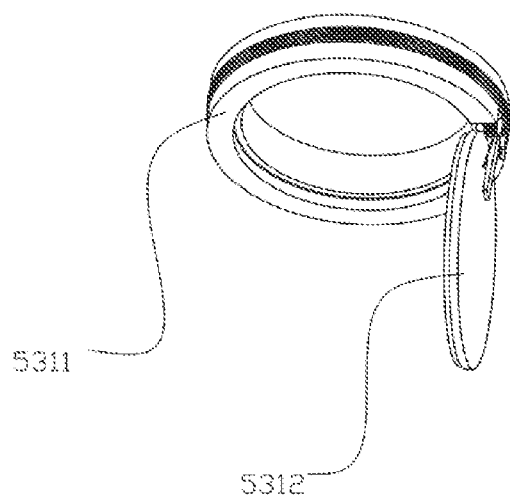
FIG. 9 is a perspective view of the valve body in one embodiment of the present disclosure.

As shown in FIG. 8 and FIG. 9, in some embodiments, the electric control flap valve mechanism 530 includes the valve body 531, the second electromagnetic drive assembly and the third inner tube 533. The valve body 531 includes the valve seat 5311 and the valve flap 5312, and a torsion spring is arranged between the valve flap 5312 and the valve seat 5311 to make the valve flap 5312 in a closed state. The second electromagnetic drive assembly is arranged on the inner wall of the second outer shell 500a, the third inner tube 533 is sleeved in the second outer shell 500a, and the diameter of the third inner tube 533 is smaller than the diameter of the opening of the valve seat 5311. The third inner tube 533 can pass through the opening of the valve seat 5311 and make the valve flap 5312 open towards the side of the bottom of the second outer shell 500a. A third magnetic member 550 is arranged at one end of the third inner tube 533. The second electromagnetic drive assembly is used to drive the third inner tube 533 to slide to make the valve flap 5312 open or close. Specifically, the valve flap 5312 is opened towards the bottom side of the second outer shell 500a. At the same time, there is a torsion spring between the valve body 531 and the valve flap 5312, which is used to close the valve flap 5312. Because the shear-seal assembly B is inserted at the collection port, the pressure at the collection port is relatively high. By setting the valve body 531 in this way, the torsion spring can make the valve flap 5312 close tightly without the force of other mechanisms. At the same time, the pressure at the collection port can also make the valve flap 5312 close tightly. Compared with the electric control ball valve mechanism 520, the electric control flap valve mechanism 530 is arranged at the bottom of the shear-seal assembly B, such that the valve body 531 can achieve a relatively tight first sealing of the second channel b.

Specifically, the electric control flap valve mechanism 530 further includes a second electromagnetic drive assembly and a third inner tube 533. Specifically, the second electromagnetic drive assembly is arranged on the inner wall of the second outer shell 500a, the third inner tube 533 is arranged inside the hollow interior of the second outer shell 500a and can pass through the opening of the valve seat 5311, the diameter of the third inner tube 533 is slightly smaller than the opening diameter of the valve seat 5311. And further, the third magnetic member 550 is arranged at one end of the third inner tube 533, and the second electromagnetic drive assembly is used to generate magnetic attraction or repulsive force on the third magnetic member 550, so that the third inner tube 533 is driven to slide along the axial direction of the second channel b to make the third inner tube 533 slide through the opening of the valve seat 5311 and open the valve flap 5312, or to make the third inner tube 533 leave the valve seat 5311 and close the valve flap 5312 under the double pressure of the torsion spring and the collection port.

Through this setting, the opening and closing of valve flap 5312 is driven by electromagnetism, with fast response speed, simple structure and stable driving, which is conducive to greatly improving the opening and closing reliability. In addition, when the third inner tube 533 leaves the opening of the valve seat 5311, the valve flap 5312 can automatically close under the double action of the torsion spring and the pressure of the collection port, which can realize the timely plugging of the collection port.

As shown in FIG. 8, in some embodiments, a first elastic element 540 is arranged between the valve seat 5311 and the second inner tube 560.

Specifically, the first elastic element 540 is sleeved on the outer side of the third inner tube 533 and is located between the valve seat 5311 and the third inner tube 533 and is provided with the third magnetic member 550. By setting of the first elastic element 540, it can ensure that the third inner tube 533 will automatically leave the opening of valve seat 5311 and the valve flap 5312 will be closed in time to block the collection port in case of the failure of the second electromagnetic drive assembly, thereby improving the reliability and safety of the shear-seal device, and providing favorable conditions for the timely separation of shear-seal assembly B and the connect-disconnect device A.

Specifically, when the second electromagnetic drive assembly drives the third inner tube 533 to open the valve flap 5312, the first elastic element 540 is in a compressed state; when the second electromagnetic drive assembly drives the third inner tube 533 to leave the opening of valve seat 5311 and make the third inner tube 533 reach the top of travel, the first elastic element 540 is in a natural state. In this way, when the second electromagnetic drive assembly fails, it can ensure that the third inner tube 533 leaves the opening of valve seat 5311 in time, thus making the valve flap 5312 close in time.

As shown in FIG. 8, in some embodiments, the second electromagnetic drive assembly includes a third electromagnetic attraction structure 5321 and a fourth electromagnetic attraction structure 5322 arranged in sequence along the axial direction of the second channel b, and the third magnetic member 550 is arranged between the third electromagnetic attraction structure 5321 and the fourth electromagnetic attraction structure 5322.

It can be understood that the second electromagnetic drive assembly is so arranged that its driving force on the third inner tube 533 is large and stable. Specifically, when driving, the third electromagnetic attraction structure 5321 and the fourth electromagnetic attraction structure 5322 generate different driving forces on the third magnetic member 550 respectively. That is, when the third inner tube 533 is driven to pass through the opening of valve seat 5311, the third electromagnetic attraction structure 5321 is attracted by the third magnetic member 550, and the fourth electromagnetic attraction structure 5322 is repelled by the third magnetic member 550. Due to the existence of torsion spring and collection port pressure, this setting can enhance the force of the third inner tube 533 to open the valve flap 5312, making the opening of valve body 531 more smooth. When it is necessary to drive the third inner tube 533 to leave the opening of the valve seat 5311, the forces of the third electromagnetic attraction structure 5321 and the fourth electromagnetic attraction structure 5322 on the third magnetic suction 550 are contrary to the above process.

Figure 11:
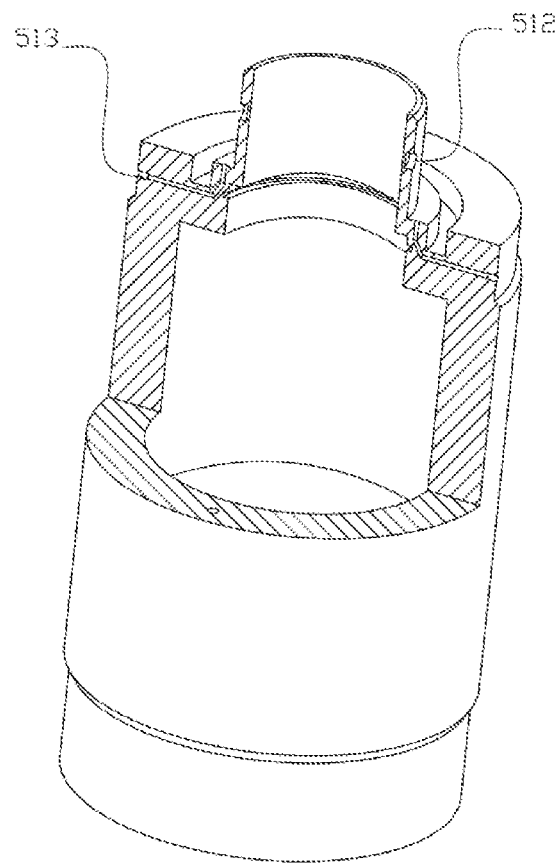
FIG. 11 is a partial sectional view of the second outer shell in one embodiment of the present disclosure.

As shown in FIG. 11, in some embodiments, the second outer shell 500a is provided with a high-pressure flow channel 513, and the high-pressure flow channel 513 is communicated with the side wall of the second outer shell 500a and the connection part 510.

Specifically, in order to play an auxiliary role in the separation of the locking assembly 200 and the connection part 510, so as to improve the timeliness of the separation between them, the connection part 510 is provided with a high-pressure flow channel 513. It should be understood that the high-pressure flow channel 513 is communicated with the external high-pressure pipeline, and the high-pressure pipeline is connected with the high-pressure power source on the mining ship or mining platform through the high-pressure pipeline. Further, the outlet of the high-pressure flow channel 513 on the connection part 510 is located at the bottom of the positioning groove 512 on the connection part 510.

In this way, the high-pressure fluid in the high-pressure pipeline can flow in from the side wall of the second outer shell 500a and spray out from the opening at the bottom of the positioning groove 512 on the connection part 510 to push the balls 230 of the locking assembly 200 away from the positioning groove 512, thus realizing the separation from the connection part 510, so as to play an auxiliary separation role between the connect-disconnect device A and the shear-seal assembly B, making the separation between the connect-disconnect device A and the shear-seal assembly B more smooth. It further improves the reliability and timeliness of the separation of the connect-disconnect device A and shear-seal assembly B.

As shown in FIG. 2 to FIG. 4, an auxiliary separation structure is arranged between the connect-disconnect device A and the shear-seal assembly B. The auxiliary separation structure includes a torsion ring 710 and a thread arranged on the connect-disconnect device A. The torsion ring 710 is threaded with the connect-disconnect device A, and the bottom end of the torsion ring 710 is abutted against the end face of the connection part 510.

Specifically, the torsion ring 710 is sleeved on the outer wall of the connect-disconnect device A and its bottom is abutted against with the end face of the connection part 510 on the shear-seal assembly B. Further, the outer wall of the connect-disconnect device A is fixedly provided with lifting ring 720, and the lifting ring 720 and the torsion ring 710 are connected by bolts. Specifically, the threads on the lifting ring 720 are set on the inner wall, and the threads of the torsion ring 710 is set on the outer wall. Therefore, the lifting ring 720 is formed with an end face that contacts with the top of torsion ring 710. In this way, by providing the lifting ring 720 and setting the threads on the lifting ring 720, it has at least the following advantages: First, it facilitates the processing of the connect-disconnect device A; Secondly, it is easy to control the axial position of the torsion ring 710 relative to the connect-disconnect device A under the initial assembly state, so that after the connect-disconnect device A is connected with the shear-seal assembly B, when the torsion ring 710 rotates to its top and abuts with the end face at the bottom threads of the lifting ring 720, it represents the installation of the torsion ring 710 in place.

Further, it should be understood that the torsion ring 710 is driven to rotate by other devices, which may be set on the connect-disconnect device A or other external devices, which can operate independently to drive the torsion ring 710 to rotate.

Specifically, the separation operation of the auxiliary separation structure is as shown following:

When the connection drive mechanism 300 fails, the torsion ring 710 is driven to rotate by other devices. Because the torsion ring 710 is threaded with the lifting ring 720, and the lifting ring 720 is fixed on the connect-disconnect device A, and the bottom of the torsion ring 710 is abutted against with the end face of the connection part 510. Therefore, when the torsion ring 710 rotates, the axial position of the torsion ring 710 relative to the shear-seal assembly B does not change, the lifting ring 720 drives the connect-disconnect device A to move upward along the axis direction of the first channel a with the help of the threads, so that the balls 230 on the locking assembly 200 leave the positioning groove 512 on the connection part 510, so as to realize the separation of the locking assembly 200 and the connection part 510, and then realize the separation of the connect-disconnect device A and the shear-seal assembly B.

In the present invention, the terms "first," "second," and "third" are merely for the purpose of description, but cannot be understood as indicating or implying relative importance. The term "multiple" means two or more unless otherwise explicitly defined. The terms "mount," "connect with," "connect," "fix," and the like shall be understood in a broad sense. For example, "connect" may mean being fixedly connected, detachably connected, or integrally connected; and "connect with" may mean being directly connected or indirectly connected through an intermediary. For those of ordinary skill in the art, specific meanings of the above terms in the present invention can be understood according to specific situations.

In the description of the present invention, it should be understood that if orientation or position relations indicated by the terms such as "upper," "lower," "left," "right," "front," "back," and the like are based on the orientation or position relations shown in the drawings, and the terms are intended only to facilitate the description of the present invention and simplify the description, rather than indicating or implying that the apparatus or element referred to must have a particular orientation and be constructed and operated in the particular orientation, and therefore cannot be construed as a limitation on the present invention.

In the description of the specification, the descriptions about the terms "an embodiment," "some embodiments," "specific embodiment(s)," and the like mean that specific features, structures, materials or characteristics described in combination with the embodiment(s) or example(s) are included in at least one embodiment or example of the present invention. In the specification, schematic expressions of the above terms do not necessarily refer to the same embodiment or example. Moreover, the specific features, structures, materials or characteristics described may be combined in a suitable manner in any one or more embodiments or examples.

The above are merely preferred embodiments of the present invention and are not intended to limit the present invention. The present invention may be subject to changes and variations for those skilled in the art. Any modifications, equivalent replacements, and improvements made within the spirit and principles of the present invention shall all be encompassed in the protection scope of the present invention.

What is claimed is:

1. A pure electric modular subsea test tree, comprising:
  a connect-disconnect device, wherein the connect-disconnect device comprises a first outer shell and a first inner tube, wherein a first channel is formed in the first inner tube; a locking assembly and a connection drive mechanism for driving the locking assembly are arranged between the first outer shell and the first inner tube; a first electrical connection plug is embedded on a bottom end face of the first outer shell, and the connection drive mechanism is electrically connected with the first electrical connection plug;

a shear-seal assembly, wherein a second channel is formed in the shear-seal assembly, and the first channel is communicated with the second channel in a connected state; the shear-seal assembly comprises a second outer shell assembly and at least one shear-seal device arranged inside the second outer shell assembly and configured to seal the second channel; a connection part configured for locking connection with the locking assembly is formed on the second outer shell assembly; a second electrical connection plug configured for inserting and matching with the first electrical connection plug is arranged on the connection part; a heating device is arranged at one end of the shear-seal device far from the connection part, and the heating device and the shear-seal device are electrically connected with the second electrical connection plug;

the heating device comprises an inner tube, an outer tube and a plurality of electric heating rods, wherein the plurality of electric heating rods is arranged between the inner tube and the outer tube at intervals along a circumferential direction;

the connection drive mechanism is an electromagnetic driving structure;

a first magnetic member is arranged on the locking assembly, and the connection drive mechanism is used to generate a magnetic force that attracts or repels the first magnetic member, so that the locking assembly is locked and connected with the connection part;

the connection part is provided with a second magnetic member, and the connection drive mechanism is used to generate the magnetic force that attracts or repels the second magnetic member;

a positioning groove is arranged on the connection part corresponding to the locking assembly;

the locking assembly comprises a fixing ring, balls and a movable ring;

the fixing ring is arranged at an outer side of the first inner tube, and a wall thickness of the fixing ring is less than a diameter of each of the balls; through holes are arranged at intervals on a circumference surface of a side wall of the fixing ring; the balls are respectively arranged at the through holes; the movable ring is sleeved at an outer side of the fixing ring and is capable to slide relative to the fixing ring; the first magnetic member is arranged at a top of the movable ring, and a bottom of the movable ring is provided with a guide groove, a groove wall of the guide groove pushes the balls to roll and engage in the positioning groove when the guide groove is in contact with the balls; and the connection drive mechanism comprises a first electromagnetic attraction structure and a second electromagnetic attraction structure arranged at intervals in a direction of an axis of the first channel, and the first magnetic member is arranged between the first electromagnetic attraction structure and the second electromagnetic attraction structure.

2. The pure electric modular subsea test tree according to claim 1, wherein an outer wall of the outer tube is provided with a thermal insulation layer.

3. The pure electric modular subsea test tree according to claim 1, wherein when the number of the shear-seal devices provided is two or more, the second outer shell assembly comprises a plurality of second outer shells and a plurality of connectors, two adjacent second outer shells are connected through the connectors, each of the shear-seal devices is arranged inside each of the second outer shells, and the heating device is sleeved in hollow interiors of the connectors;

when the number of the shear-seal devices provided is two or more, the shear-seal device closer to a top of the shear-seal assembly is an electric control ball valve mechanism, and the shear-seal device closer to a bottom of the shear-seal assembly is an electric control ball valve mechanism or an electric control flap valve mechanism.

4. The pure electric modular subsea test tree according to claim 3, wherein:

the electric control ball valve mechanism comprises a ball valve drive device, a drive ring and a ball valve assembly;

the ball valve assembly comprises an upper valve seat, a lower valve seat and a ball valve body, wherein the upper valve seat and the lower valve seat are arranged in the second outer shell; the ball valve body is rotatably arranged in a valve cavity formed between the upper valve seat and the lower valve seat; the ball valve body is provided with a shear notch, and the ball valve body rotates to close the second channel;

the ball valve drive device is arranged on an inner side wall of the second outer shell and at a bottom of the ball valve assembly; the drive ring connects the ball valve drive device and the ball valve body; the ball valve drive device is used to drive the drive ring to slide along an axial direction to drive the ball valve body to rotate.

5. The pure electric modular subsea test tree according to claim 4, wherein:

on a side wall of the ball valve body and on an axis where a center of a circle is located, bosses are symmetrically arranged along the radial direction, first guide grooves are arranged on an inner wall of the drive ring, and each of the bosses is capable to slide relative to the first guide groove correspondingly;

the side wall of the ball valve body is symmetrically provided with second guide grooves deviating from a center of the ball valve body, and the inner wall of the drive ring is provided with drive blocks correspondingly inserted in the second guide groove;

when the drive ring slides along the axial direction, the drive blocks push the ball valve body to rotate.

6. The pure electric modular subsea test tree according to claim 4, wherein the ball valve drive device is a hollow shaft motor, and the drive ring is threaded with a rotor of the hollow shaft motor.

7. The pure electric modular subsea test tree according to claim 4, wherein a second inner tube is arranged inside the second outer shell, the drive ring is sleeved at an outer side the second inner tube, and a spring is connected between the lower valve seat and a top end of the second inner tube.

8. The pure electric modular subsea test tree according to claim 3, wherein:

the electric control flap valve mechanism comprises a valve body, a second electromagnetic drive assembly and a third inner pipe; the valve body comprises a valve seat and a valve flap, and a torsion spring configured to control the valve flap in closed state is arranged between the valve flap and the valve seat;

wherein, the second electromagnetic drive assembly is arranged on an inner side wall of the second outer shell, the third inner pipe is sleeved in the second outer shell, and a diameter of the third inner pipe is smaller than a diameter of an opening of the valve seat;

the third inner pipe is capable to penetrate the opening of the valve seat and make the valve flap open towards a bottom side of the second outer shell; a third magnetic member is arranged at one end of the third inner pipe; the second electromagnetic drive assembly is used to drive the third inner pipe to slide, so as to make the valve flap open or close.

9. The pure electric modular subsea test tree according to claim 7, wherein a first elastic element is arranged between the valve seat and the second inner tube.

10. The pure electric modular subsea test tree according to claim 8, wherein the second electromagnetic drive assembly comprises a third electromagnetic attraction structure and a fourth electromagnetic attraction structure arranged in sequence in an axial direction of the second channel, and the third magnetic member is arranged between the third electromagnetic attraction structure and the fourth electromagnetic attraction structure.

11. The pure electric modular subsea test tree according to claim 3, wherein the second outer shell is provided with a high-pressure flow channel, and the high-pressure flow channel is communicated with a side wall of the second outer shell and the connection part.

12. The pure electric modular subsea test tree according to claim 1, wherein an auxiliary separation structure is arranged between the connect-disconnect device and the shear-seal assembly; the auxiliary separation structure comprises a torsion ring and a thread arranged on the connect-disconnect device; the torsion ring is threaded with the connect-disconnect device, and a bottom end of the torsion ring is abutted against an end face of the connection part.

* * * * *